Aug. 28, 1962 — L. V. WAY, JR — 3,051,022
VARIABLE SPEED GEARING
Filed April 24, 1961 — 5 Sheets-Sheet 1

INVENTOR
LEE V. WAY, JR.
BY
ATTORNEY

Aug. 28, 1962 L. V. WAY, JR 3,051,022
VARIABLE SPEED GEARING
Filed April 24, 1961 5 Sheets-Sheet 2

INVENTOR
LEE V. WAY, JR.
BY B. P. Fishburne, Jr.
ATTORNEY

Aug. 28, 1962 L. V. WAY, JR 3,051,022
VARIABLE SPEED GEARING
Filed April 24, 1961 5 Sheets-Sheet 3
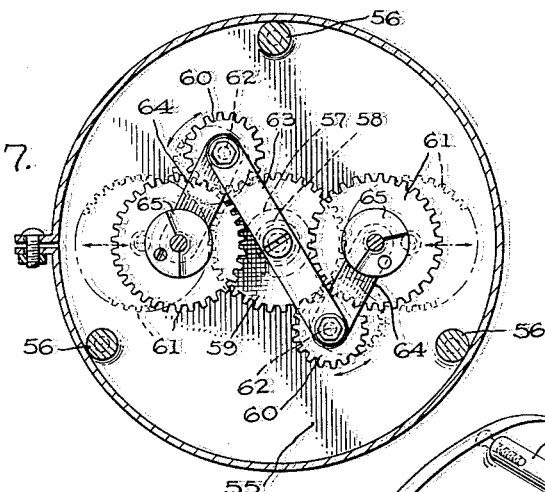
FIG. 7.
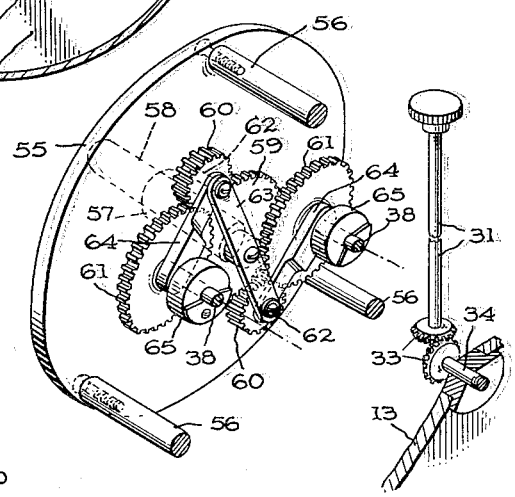
FIG. 8.
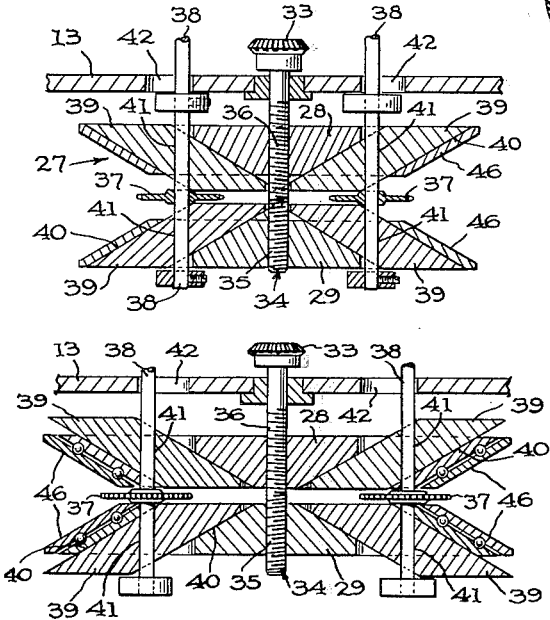
FIG. 9.
FIG. 10.
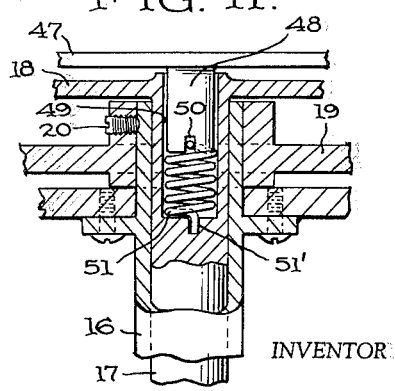
FIG. 11.
INVENTOR
LEE V. WAY, JR.
BY B. P. Fishburn, Jr.
ATTORNEY Aug. 28, 1962 L. V. WAY, JR 3,051,022
VARIABLE SPEED GEARING
Filed April 24, 1961 5 Sheets-Sheet 4

INVENTOR
LEE V. WAY, JR.
BY *B. P. Fishburn, Jr.*
ATTORNEY

Aug. 28, 1962   L. V. WAY, JR   3,051,022
VARIABLE SPEED GEARING
Filed April 24, 1961   5 Sheets-Sheet 5

INVENTOR
LEE V. WAY, JR.
BY B. P. Fishburn, Jr.
ATTORNEY

United States Patent Office 3,051,022
Patented Aug. 28, 1962

3,051,022
VARIABLE SPEED GEARING
Lee V. Way, Jr., Sumter, S.C.
(306 Firwood Drive, Huron, Ohio)
Filed Apr. 24, 1961, Ser. No. 104,957
5 Claims. (Cl. 74—793)

My invention relates to variable speed gearing.

An object of the invention is to provide a simplified variable speed transmission wherein the rotational speed of the output shaft of the transmission may be infinitely varied from zero to the full rotational speed of the input shaft, without slippage and with maximum efficiency due to the construction of the device.

A further and more specific object of teh invention is to provide an infinitely variable speed transmission, embodying a novel and compact adjustable pulley assembly, including means to vary the effective diameter of the same through relatively wide limits, in conjunction with a coacting sprocket chain and sprocket gearing which is adjusted in response to the adjustment of the pulley assembly to regulate the rotational speed of the output shaft through wide limits.

Another object of the invention is to provide means for counterbalancing the mass of the sprocket chain and gearing and the adjustable tensioning means for the sprocket chain throughout the operating speed range of the transmission.

Another object is to provide cam means associated with the axially adjustable pulley sections to automatically vary the effective spacing between the pair of sprocket wheels which engage the primary sprocket chain between the pulley sections, in response to axial shifting of the pulley sections.

A further object is to provide upon the primary sprocket chain novel and simplified means for constant engagement with the frictionless conical faces of the pulley sections in all adjusted positions of the latter.

Another object is to provide direct and positive means for shifting the conical pulley sections axially toward and from each other during the operation of the transmission to vary the output speed at will.

Other objects and advantages of the invention will be apparent during the course of the following description.

Figure 1:
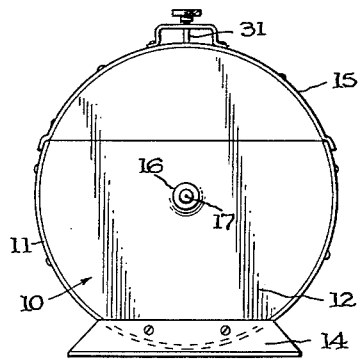
Figure 2:
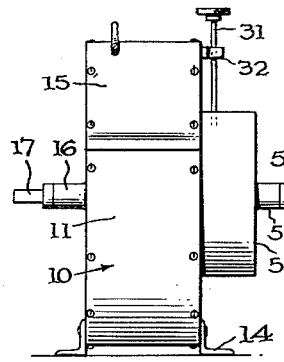
Figure 3:
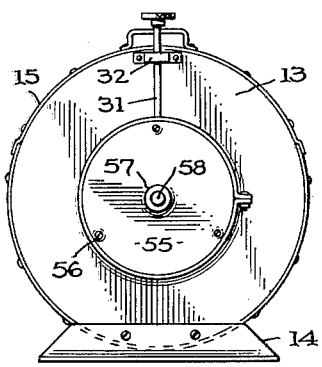
Figure 4:
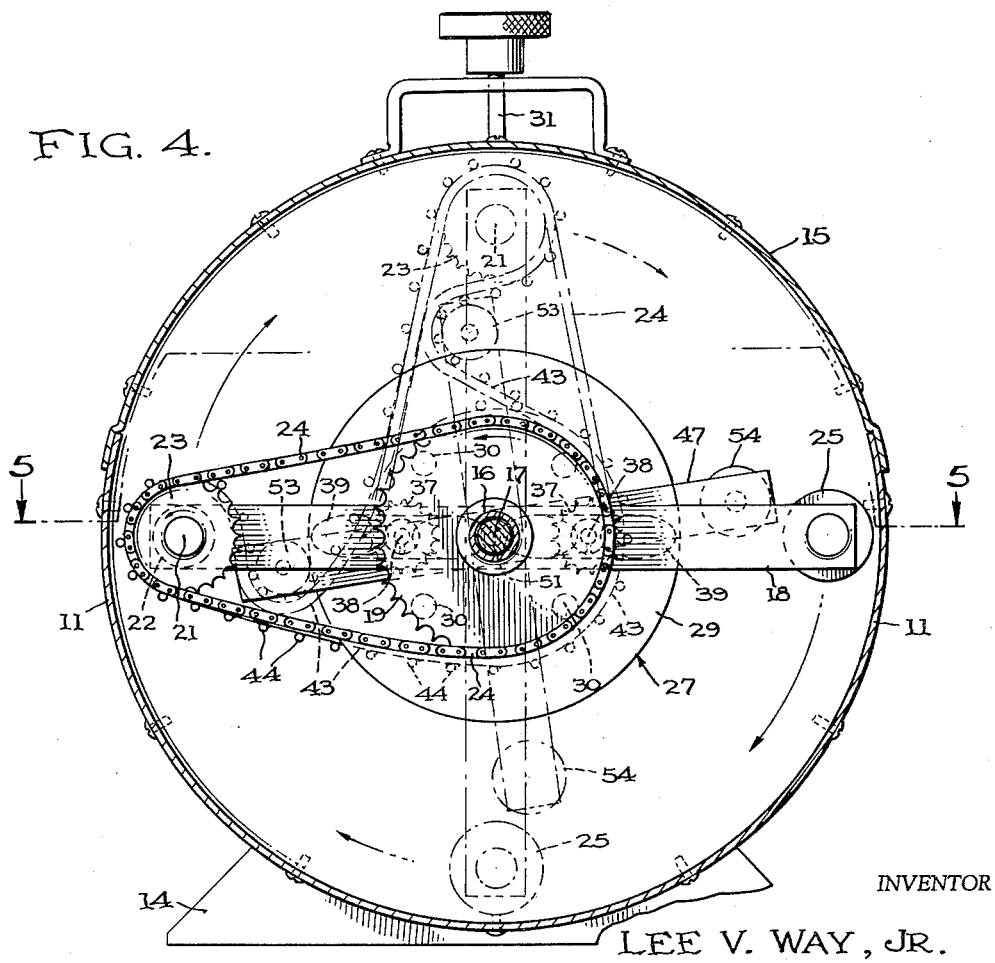
Figure 5:
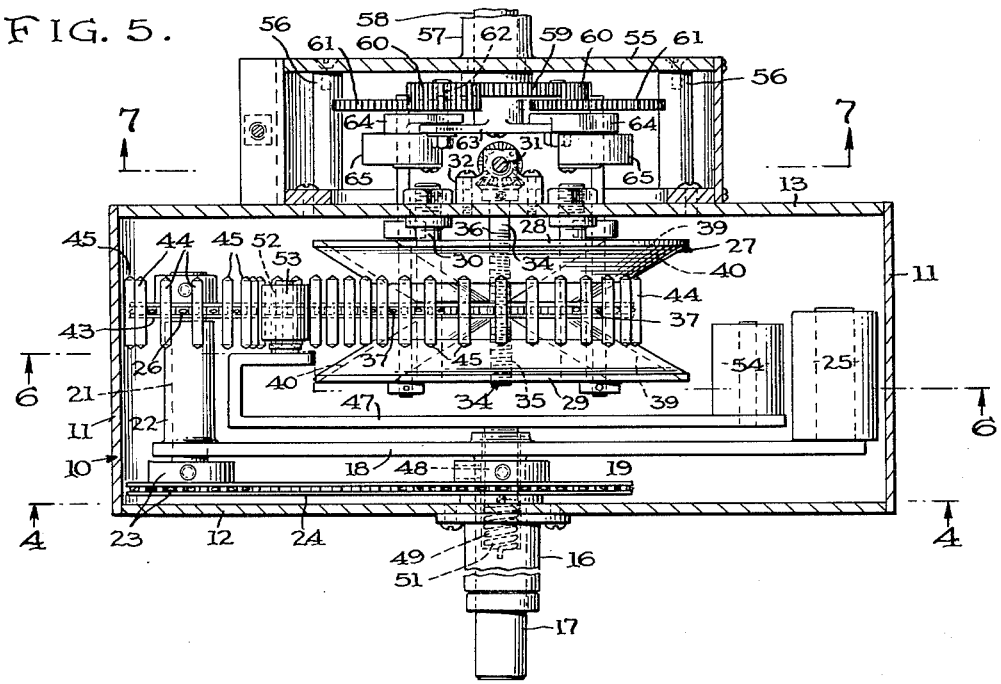
Figure 6:
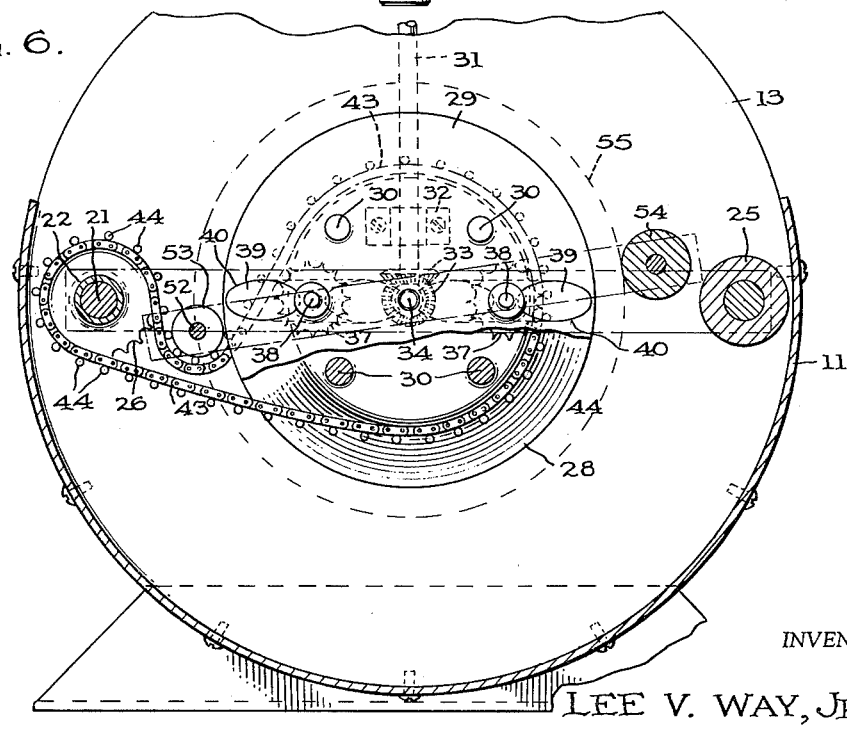
Figure 12:
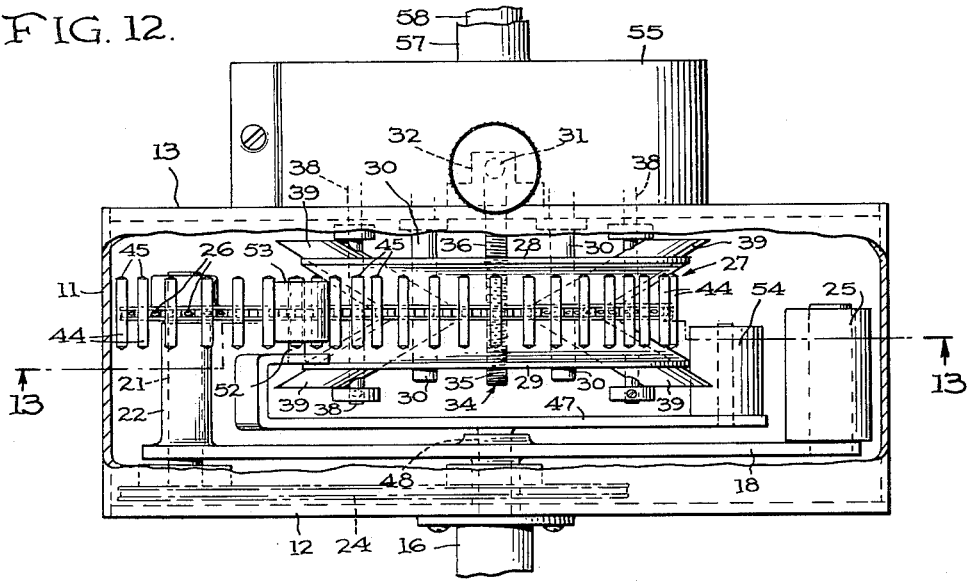
Figure 13:
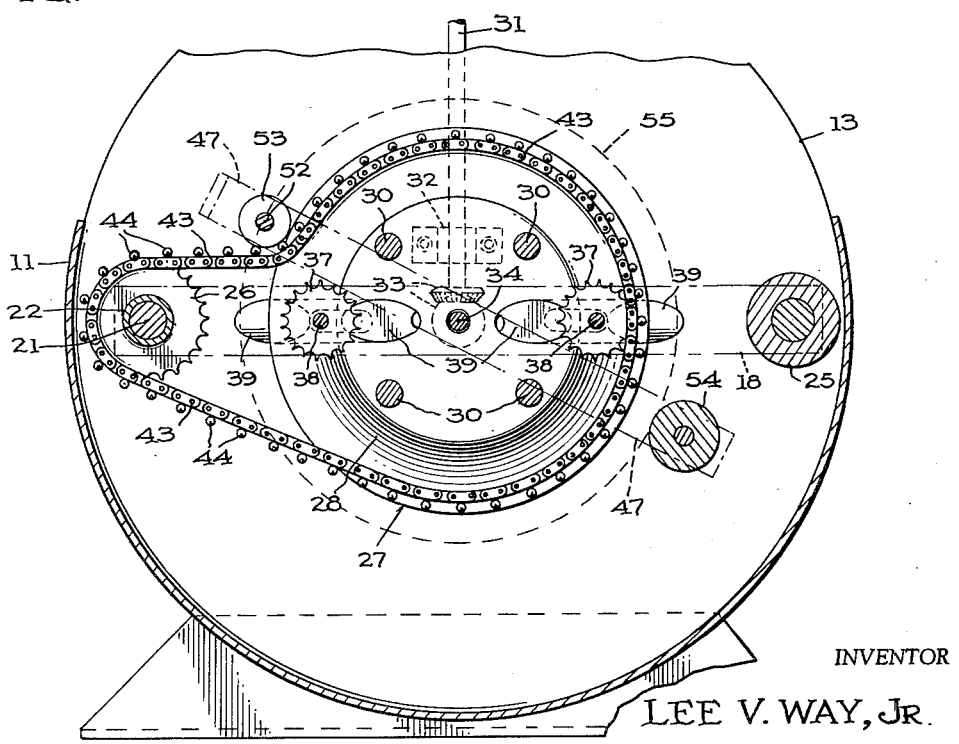
Figure 14:
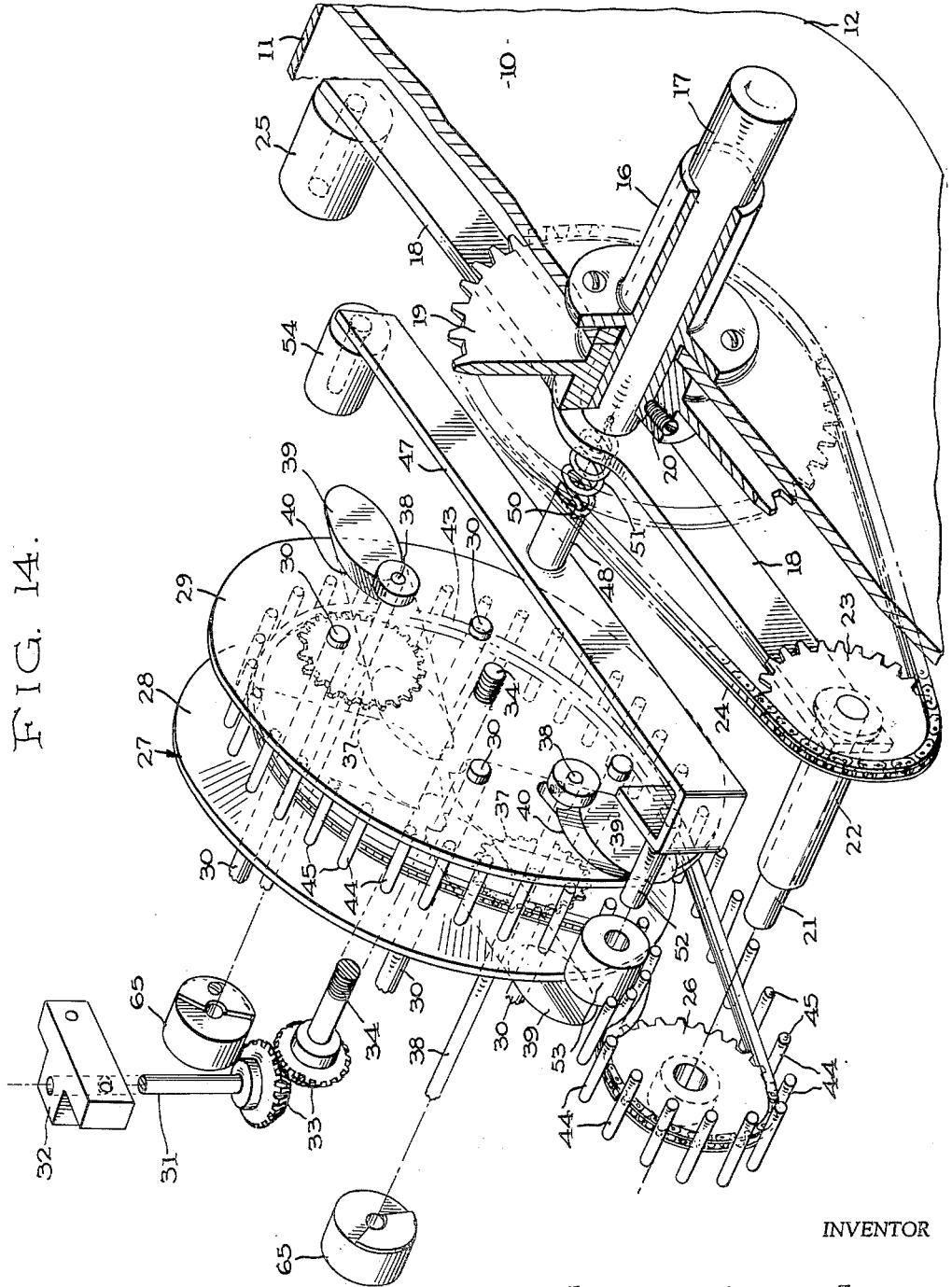

In the accompanying drawings forming a part of this application and in which like numerals are employed to designate like parts throughout the same, FIGURE 1 is an end elevation of a variable speed transmission according to the invention, FIGURE 2 is a side elevation of the same, FIGURE 3 is a further end elevation of the transmission, FIGURE 4 is an enlarged transverse vertical section taken on line 4—4 of FIGURE 5, FIGURE 5 is a horizontal section taken substantially on line 5—5 of FIGURE 4, with parts in elevation, FIGURE 6 is a fragmentary vertical section taken substantially on line 6—6 of FIGURE 5, FIGURE 7 is a similar section taken on line 7—7 of FIGURE 5, FIGURE 8 is a fragmentary perspective view of an output gear train and associated elements, FIGURE 9 is an enlarged central cross section through a pulley and gearing unit and associated elements, FIGURE 10 is a similar view showing a slight modification of the pulley structure in accordance with the preferred manner of building the pulley, FIGURE 11 is an enlarged fragmentary central cross sectional view taken through the input shaft of the transmission and associated elements, FIGURE 12 is a plan view partly in section similar to FIGURE 5 and showing the transmission adjusted for maximum rotation of the output shaft, FIGURE 13 is a vertical section taken substantially on line 13—13 of FIGURE 12, FIGURE 14 is a perspective view, partly exploded, of the transmission with parts broken away and parts omitted to be read in conjunction with FIGURE 8.

In the drawings wherein for the purpose of illustration is shown a preferred embodiment of the invention, the numeral 10 designates a casing for the transmission which may be cylindrical, including a cylindrical side wall 11 and end walls 12 and 13, suitably detachably rigidly secured to the cylindrical side wall. The casing is provided with a base or support 14 which may be arranged horizontally or vertically in use, or at any desired angle. Preferably, the casing includes an arcuate side wall portion or cover 15 which is readily removable to gain access to the interior of the transmission.

Mounted centrally upon the casing end wall 12 and preferably formed integral therewith is a fixed bearing 16, within which is journaled for free rotation an input input shaft 17 carrying an elongated transverse arm 18 for rotation therewith, the arm 18 being arranged near and inwardly of the casing end wall 12. A fixed relatively large sprocket wheel 19 receives the input shaft 17 inwardly of the casing end wall 12 and is rigidly secured as at 20 to the fixed bearing 16 and wall 12, or otherwise rigidly held against rotation with the input shaft 17. Journaled upon one free end of the arm 18 and bodily carried thereby is an idler shaft 21 journaled for rotation within a bearing 22 rigid with the arm 18. The idler shaft 21 carries a relatively small drive sprocket wheel 23 rigid therewith, and engaged by a driving sprocket chain 24 which is also trained about the larger stationary sprocket wheel 19 previously described. During operation, as the input shaft 17 and the arm 18 revolve clockwise, FIGURE 4, within the casing 10, the sprocket wheel 23 and shaft 21 travel or orbit about the axis of the fixed sprocket wheel 19, and constant counterclockwise rotation of the sprocket wheel 23 and shaft 21 is obtained through the medium of the chain 24.

The arm 18 extends for a substantial distance on the opposite side of the fixed sprocket wheel 19 remote from the shaft 21 and carries a suitable counterbalancing weight 25 to counterbalance the mass of the shaft 21 and associated elements.

Also secured rigidly to the shaft 21 for rotation therewith and bodily carried by such shaft is a second sprocket gear 26 of the same pitch diameter as the sprocket wheel 23. The sprocket wheels 23 and 26 are spaced apart axially within the casing 10 upon shaft 21, as shown.

Fixedly mounted centrally upon the opposite casing wall 13, in axial alignment with the input shaft 17, is a non-rotating axially adjustable pulley and gearing unit 27, which is the heart of the transmission. The unit 27 embodies first and second conically tapered pulley halves or sections 28 and 29 respectively, whose effective conical working faces may be constituted by a pair of substantially frictionless ball bearing races 46' or the like, as shown in FIGURE 10, illustrating the preferred construction. If desired, with slight resultant loss in efficiency due to higher friction, the working faces 46 of the pulley sections 28 and 29 may be plain machined faces, as shown in the other figures of the drawings for ease of illustration only. The opposed conical pulley sections 28 and 29 are mounted for limited axial displacement relative to each other and relative to the end wall 13 upon a plurality of axially extended parallel pin members 30, which are rigidly anchored to the end wall 13 and spaced radially outwardly from the central axis of the pulley unit 27.

Means are provided to adjust the pulley sections 28 and 29 axially toward and from each other, comprising a radially extending rotary shaft 31 suitably journaled within fixed bearings 32 on the casing and wall 13 and operatively connected through a pair of constantly meshing miter gears 33, with an axial adjusting shaft 34, which is right and left hand screw-threaded at 35 and 36 and has corresponding screw-threaded engagement within screw-threaded openings of the respective pulley sections 28 and 29 at the axial centers thereof.

Associated with the pulley unit 27 and forming an integral part of the same is a pair of driven identical sprocket wheels 37, which are adjustable laterally with respect to the central axis of the transmission, and whose effective combined pitch diameter with respect to the stationary sprocket wheel 19 regulates the variation in speed of the output shaft of the transmission, to be described, through wide limits between zero r.p.m. and the full rotational speed of the input shaft 17. Each sprocket wheel 37 is rigid with an axial shaft 38, journaled for free rotation within and laterally shiftable with a pair of combined bearing and cam elements 39, which may be cylindrical in cross section or any other preferred shape, and obliquely set in correspondingly shaped opening 40 formed through the pulley sections 28 and 29 parallel to the conical working faces 46 thereof. The aligned bores 41, FIGURES 9 and 10, of the pairs of elements 39 receive each shaft 38 rotatably, and each shaft 38 extends through a clearance slot 42 in the adjacent end wall 13 and through companion clearance slots in the pulley sections 28 and 29, whereby each shaft 38 and its sprocket wheel 37 is shiftable radially inwardly or outwardly relative to the pulley sections upon rotation of the screw-threaded adjusting shaft 34, which shifts the pulley sections axially. That is to say, for a given axial displacement or adjustment of the two pulley sections 28 and 29, there will be a corresponding radial displacement inwardly or outwardly of the shafts 38 and sprocket wheels 37, to vary the overall effective pitch diameter across the two sprocket wheels 37. It is the relationship of the pitch diameter of the fixed sprocket wheel 19 to the variable effective combined pitch diameter of the two sprocket wheels 37 which results in the variable transmission of rotational speed between the input shaft 17 and the output shaft 58 yet to be described. The combined bearing and cam elements 39 allow the shafts 38 and their sprocket wheels 37 to rotate freely while simultaneously allowing inward or outward radial displacement thereof upon the pulley unit 27; which unit does not rotate, but is axially adjustable to vary the effective diameter through the conical working faces 46 of the pulley sections, in direct proportion to variations in the effective pitch diameter across the sprocket wheels 37.

Engaging about the driving sprocket wheel 26 of shaft 21 and about the driven sprocket wheels 37 is an endless sprocket chain 43 having sufficient slack to conform to the limits of radial adjustment of the sprocket wheels 37. Rigidly secured to the outer side of the sprocket chain 43 at equidistantly spaced points along the entire length of the same, is a multiplicity of bearing pins 44 having beveled ends 45 for matching engagement with the conical working faces 46 of the pulley sections 28 and 29. The ends of these pins 44 constantly engage the conical faces of the two pulley sections in all selected adjusted positions of the latter to maintain the chain 43 in exact engagement with the teeth of the sprocket wheels 37 at the pitch diameters of the same and in all radially adjusted positions of such sprocket wheels.

Means are provided to constantly tension the sprocket chain 43 to take up excessive slack in the same at all adjusted positions of the unit 27. Such means comprises a cross arm 47 having a central axial hub extension 48, engageable rotatably within an axial bore 49, FIGURE 11, formed in the input shaft 17. The hub portion 48 may have a slot 50 formed therethrough to receive and anchor one end of a suitable torsion spring 51 disposed within the bore 49 and having its other end anchored therein as at 51'. The spring 51 resists rotation of the cross arm 48 in one direction. The latter has at one end an axial shaft extension 52 upon which is freely journaled a roller 53, which engages the exterior of the pins 44 to take up the slack in the chain 43, under influence of the spring 51. At its end remote from the roller 53, the arm 47 preferably carries a counterbalance weight 54 to counteract the mass of the roller 53 and associated elements. Obviously, specifically different chain tensioning means may be employed within the scope of the invention if preferred, and it is desired not to limit the invention in this respect. The same remarks apply in connection with the specific gearing 19—23—24 previously described, as it may be desirable in some instances to utilize a spur gear train or the like between the input shaft 17 and the shaft 21, instead of the gearing shown.

It is now apparent, when clockwise rotation is imparted to the input shaft 17, the shaft 21 and both of the sprocket wheels 23 and 26 carried thereby will orbit continuously clockwise about the fixed sprocket wheel 19 and non-rotatable pulley and gearing unit 27. The primary chain 43 and its described tensioning means will also orbit with the shaft 21 and associated elements, and there will be a resilient force imparted to the chain 43 at all times by virtue of the arm 47 and spring 51.

Spaced axially of the casing end wall 13 is a further support plate 55, rigidly connected to the casing proper as by bolt means 56. Secured centrally to the support plate 55 is a fixed bearing 57, preferably in axial alignment with the bearing 16. Journaled for rotation within the bearing 57 is an output shaft 58, carrying a spur gear 59 for rotation therewith, inwardly of the plate 55. Meshing with the gear 59 at diametrically opposite points are relatively small diameter gears 60, in turn constantly meshing with larger intermediate gears 61 on opposite sides of the gear 59 and axially inwardly thereof. The gears 60 are rotatable upon stub shafts 62, rigid with a cross arm 63, which may be supported at its longitudinal center by the rotary output shaft 58, but which is restrained against rotation by links 64 having corresponding ends secured to the stub shafts 62 and their other ends pivotally connected with the variable output or driven shafts 38, which carry the sprocket wheels 37. Mounted upon each output shaft 38 just inwardly of the links 64 are conventional anti-rotation devices or one-way clutches 65. The anti-rotation devices 65 couple the driven shafts 38 to the intermediate gears 61 and are active in the same direction of rotation as the shafts 38.

Whenever the main output shaft 58 is under load, at least one of the variable sprockets 37 is always being pulled by the primary chain 43 under influence of the input shaft 17 and associated driving elements. So long as there is a fixed adjustment of the sprocket wheels 37 through the medium of the screw shaft 34 and associated parts, both of the sprocket wheels 37 will be pulling or counteracting the driving force of the chain 43. However, during adjustment of the sprocket wheels 37 by the screw shaft 34, and while the transmission is in operation, the anti-rotation devices 65 must compensate for the instantaneous variation in the effective pitch diameter, that is the change in effective pitch diameter, across the sprocket wheels 37; and one of these sprocket wheels 37 must be allowed to partake of some retrograde or reverse rotation during the adjustment period when the sprocket wheels 37 are being shifted radially. The anti-rotation or one-way clutch devices 65 permit of this action and after the adjustment of the sprocket wheels 37 is set, both sprocket wheels will again be pulling and both anti-rotation devices will lock up or become active to transmit rotation through the output gear train, FIGURE 8, to the output shaft 58.

Power is never lost through the transmission, even during the adjustment inwardly or outwardly of the sprocket wheels 37, and at least one such sprocket wheel is always pulling or transmitting power. However, as described, during radial adjustment of the sprocket wheels 37, one of them may rotate reversely to compensate for the change in effective pitch diameter, and, the devices 65 in the system are for this purpose.

In connection with the operation of the transmission, attention is directed particularly to FIGURES 5 and 6 showing the relative positions of the vital parts when the main output shaft 58 is at or near rest while the input shaft 17 may be in full speed operation. That is to say, FIGURES 5 and 6 show the transmission when little or no rotational speed put in through the shaft 17 is being imparted to the output shaft 58. Through the medium of the control shaft 34 and associated elements, the pulley sections 28 and 29 are spread apart a maximum distance and the primary chain 43 is orbiting on the smallest effective diameter of the pulley and gearing unit 27, FIGURES 5 and 6. By virtue of the coaction between the adjustable pulley sections 28 and 29 and the bearing and cam elements 39, the sprocket wheels 37 in FIGURES 5 and 6 are now positioned a minimum distance apart diametrically of the unit 27, and the effective combined pitch diameter across the sprocket wheels 37 is at a minimum.

The orbiting chain 43 is always in mesh with the sprocket wheels 37 while riding on any given effective diameter of the two pulley sections. The chain 43 is likewise always in mesh with the sprocket wheel 26 at all adjusted positions of the unit 27. However, with the mechanism adjusted for zero speed on the output shaft 58, FIGURES 5 and 6, and while the chain 43 orbits with the shaft 21 and sprocket wheel 26, it does not move or slide linearly upon the conical working faces of the pulley sections 28 and 29 and does not therefore impart rotation to the sprocket wheels 37 of the pulley and gearing unit 27. Consequently, the shafts 38 do not rotate and the output shaft 58 is locked at zero.

With reference to FIGURES 12 and 13, showing the maximum output speed adjustment of the transmission, the output shaft 58 will turn at the same speed as the input shaft 17. Obviously, between the limits of adjustment shown in FIGURES 5 and 6 and 12 and 13, the rotational speed of the output shaft 58 may be varied infinitely by turning the adjusting shafts 31 and 34 to thereby adjust the pulley sections 28 and 29 axially between the limits shown in the mentioned figures of the drawings.

With continued reference to FIGURES 12 and 13, showing the minimum spacing between the pulley sections 28 and 29 and therefore the maximum effective diameter of the pulley unit and the maximum effective combined pitch diameter across the two sprocket wheels 37, the output shaft 58 is being driven with the full rotational speed of the input shaft 17. The chain 43 continues to orbit with shaft 21 and gear 26 and the chain 43 continues to mesh during orbiting with the sprocket wheels 37 on shafts 38. As the chain 43 orbits in its expanded condition, FIGURE 13, under influence of constantly turning gear 26, the chain slides or moves linearly over the conical working faces of pulley sections 28 and 29 and consequently imparts rotation to one of the sprocket wheels 37 and its shaft 38 at all times, and at such a rate so as to cause through the output gearing shown in FIGURES 7 and 8 maximum rotation of the main output shaft 58 at a speed equal to that of the input shaft 17.

The mode of operation of the transmission for intermediate speeds of the output shaft 58 and intermediate adjusted positions of the unit 27 should be obvious without any further description. The output shaft 58 may have its speed infinitely varied between zero r.p.m. and the full speed of rotation of the input shaft 17, as previously stated.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. Variable speed gearing comprising supporting means, input and output shafts journaled for rotation upon the supporting means, a stationary sun gear secured to the supporting means near the input shaft, planet gearing connected with the input shaft to turn therewith and operatively engaging the sun gear and orbiting the same and driven thereby and including a constantly turning sprocket wheel, an adjustable pulley and gearing unit secured to the supporting means and held against rotation, said unit comprising a companion pair of conically tapered pulley sections adapted to move axially relative to each other for varying the effective pulley diameter, means connected with said pulley sections to shift them axially toward or from each other, combined bearing and cam elements associated with the pulley sections and being shiftable radially of the pulley sections inwardly or outwardly when the pulley sections are adjusted axially away from or toward each other, a pair of shafts journaled for rotation upon and carried bodily by said bearing and cam elements and shiftable radially therewith, a companion pair of sprocket wheels secured to said shafts to turn and shift radially therewith, a sprocket chain trained about said pulley and gearing unit and the first-named sprocket wheel of the planet gearing and constantly meshing with at least one of said companion pair of sprocket wheels during orbiting of the planet gearing and having parts constantly bearing upon the conical faces of said pulley sections, resilient slack take-up means for said sprocket chain and orbiting with the sprocket chain and planet gearing around said pulley and gearing unit, and gearing operatively interconnecting said pair of shafts with said output shaft.

2. Variable speed gearing comprising casing means, input and output shafts journaled for rotation upon opposite ends of the casing means, a stationary gear fixed to the casing means near the input shaft, orbital gearing connected with the input shaft to turn therewith and operatively connected with said stationary gear and including a constantly rotating and orbiting sprocket wheel, means to counterbalance the mass of the orbital gearing during orbiting of the same and connected with said input shaft, a non-rotatable variable diameter pulley and gearing unit carried by the casing means and including a companion pair of radially shiftable rotary shafts journaled for rotation upon said unit and having their spacing varied when the effective diameter of the pulley and gearing unit is correspondingly varied, means to vary the effective diameter of said unit and to thereby vary the spacing of said pair of shafts, companion sprocket wheels secured to said shafts of the unit for rotation with said shafts and radially shiftable therewith, a sprocket chain engaging endlessly about said unit and the first-named sprocket wheel and constantly meshing with at least one of said companion sprocket wheels to drive the same or to lock the same against rotation in accordance with the particular adjustment of said unit, and gearing interconnecting said output shaft and said companion pair of rotary shafts and driven by at least one of said shafts and including anti-rotation means to allow reverse rotation of one of said pair of shafts during adjustment of said unit.

3. In a variable speed transmission, casing means, input and output rotary shafts journaled upon the casing means, a fixed sprocket wheel secured to the casing means near the input shaft, a cross arm secured to the input shaft to turn therewith near the fixed sprocket wheel, a shaft carried by said arm near its outer end to turn therewith and orbiting the fixed sprocket wheel, a first sprocket wheel secured to said shaft to orbit and revolve therewith, a first sprocket chain trained about said fixed and first sprocket wheels, a counterweight on the end of said arm remote from said shaft, a second sprocket wheel secured to said shaft in spaced relation to the first sprocket wheel and having the same pitch diameter as the first sprocket wheel and turning and orbiting therewith, a variable diameter pulley and sprocket wheel unit including a pair of conically tapered pulley sections and a pair of radially shiftable sprocket wheels carried by the casing means and held against rotation, screw-threaded means to vary the effective diameter of said unit, a second sprocket chain spanning said unit and second sprocket wheel and meshing at all times with at least one of the sprocket wheels of said unit and orbiting said unit with the second sprocket wheel upon rotation of the input shaft, resilient slack take-up means for the second sprocket chain connected with the input shaft and orbiting with the second sprocket chain, and a gear train including one-way clutch means for the sprocket wheels of said unit operatively interconnecting such sprocket wheels with said output shaft.

4. In a variable speed transmission, casing means, input and output shafts journaled for rotation upon the casing means, orbital drive gearing including a sprocket wheel connected with and driven by the rotation of the input shaft, a variable diameter non-rotary pulley and gear unit adjustably secured to said casing means near said sprocket wheel of the orbital gearing and including axially shiftable conically tapered pulley sections, rotary means connected with said pulley sections of the unit to shift the same axially for varying the effective pulley diameter, the pulley sections having oblique passage means formed therein, combined bearing and cam elements disposed movably within the oblique passage means and shiftable radially upon said unit in response to axail adjustment of the pulley sections, a pair of shafts bodily carried by said bearing and cam elements and journaled for rotation thereon, sprocket wheels secured to said shafts for rotation and radial shifting therewith and having a combined effective variable pitch diameter in conjunction with the variable effective pulley diameter, a sprocket chain trained endlessly about said unit and sprocket wheel of the orbital drive gearing and meshing at all times with at least one of the sprocket wheels of said shafts and orbiting with said orbital gearing around said variable unit and including longitudinally spaced bearing elements which engage the tapered faces of the pulley sections, orbital slack take-up means for said sprocket chain to maintain the latter in positive engagement with said unit during all adjusted positions thereof, and a gear train interconnecting said output shaft and said pair of shafts and including separate one-way clutch means to allow retrograde turning of either of said pair of shafts.

5. The invention as defined by claim 4, and wherein said conically tapered pulley sections include freely rotatable substantially frictionless working faces and said spaced bearing elements of said sprocket chain are a multiplicity of pins having beveled ends for mating engagement with said frictionless working faces of the pulley sections.

References Cited in the file of this patent

UNITED STATES PATENTS

| | | |
|---|---|---|
| 2,101,845 | Fraser | Dec. 14, 1937 |
| 2,455,407 | Christmann | Dec. 7, 1948 |
| 2,582,620 | Colucci | Jan. 15, 1952 |
| 2,941,421 | Plotti | June 21, 1960 |